United States Patent
Pizanti et al.

(10) Patent No.: US 6,923,435 B2
(45) Date of Patent: Aug. 2, 2005

(54) HYDRAULIC VIBRATION-DAMPING SUPPORT

(75) Inventors: Thierry Pizanti, La Ferte Villeneuil (FR); Loïc Collet, Gohory (FR)

(73) Assignee: Hutchinson, Paris (FR)

( * ) Notice: Subject to any disclaimer, the term of this patent is extended or adjusted under 35 U.S.C. 154(b) by 0 days.

(21) Appl. No.: 10/208,634

(22) Filed: Jul. 30, 2002

(65) Prior Publication Data

US 2003/0038414 A1 Feb. 27, 2003

(30) Foreign Application Priority Data

Aug. 7, 2001 (FR) .............................. 01 10545
Aug. 31, 2001 (FR) .............................. 01 11325

(51) Int. Cl.[7] .............................. F16F 13/00; B60K 5/12
(52) U.S. Cl. .............................................. 267/140.13
(58) Field of Search ..................... 267/140.11, 140.13, 267/140.4, 141.2–141.5, 219; 248/560, 562, 636, 638

(56) References Cited

U.S. PATENT DOCUMENTS

| 4,607,828 | A | * | 8/1986 | Bodin et al. | 267/140.13 |
| 4,647,023 | A | * | 3/1987 | Ray et al. | 267/219 |
| 4,711,206 | A | * | 12/1987 | Andra et al. | 267/140.13 |
| 4,742,999 | A | * | 5/1988 | Flower | 267/140.13 |
| 4,852,864 | A | * | 8/1989 | Bitschkus et al. | 267/219 |
| 5,340,093 | A |   | 8/1994 | Rudolph | |
| 5,346,189 | A |   | 9/1994 | Rudolph | |
| 6,032,937 | A | * | 3/2000 | Kojima et al. | 267/140.14 |
| 6,364,294 | B1 | * | 4/2002 | Gennesseaux et al. | 267/140.13 |
| 6,637,734 | B2 | * | 10/2003 | Thomazeau et al. | 267/140.13 |

FOREIGN PATENT DOCUMENTS

| EP | 0 354 381 | | 2/1990 |
| EP | 0 527 302 A1 | | 2/1993 |
| FR | 2674590 A1 | * | 10/1992 |
| FR | 2 751 042 | | 1/1998 |
| JP | 05010375 | | 1/1993 |
| JP | 06307491 | | 1/1994 |
| JP | 08014314 | | 1/1996 |

* cited by examiner

*Primary Examiner*—Christopher P. Schwartz
(74) *Attorney, Agent, or Firm*—Marshall, Gerstein & Borun LLP

(57) ABSTRACT

A hydraulic vibration-damping support comprising two strength members interconnected by an elastomer body defining in part a working chamber filled with liquid, said working chamber communicating via a constricted passage with a compensation chamber separated from said working chamber by a rigid partition. The constricted passage is made up of two stages defined by two pieces of sheet metal forming the rigid partition.

5 Claims, 5 Drawing Sheets

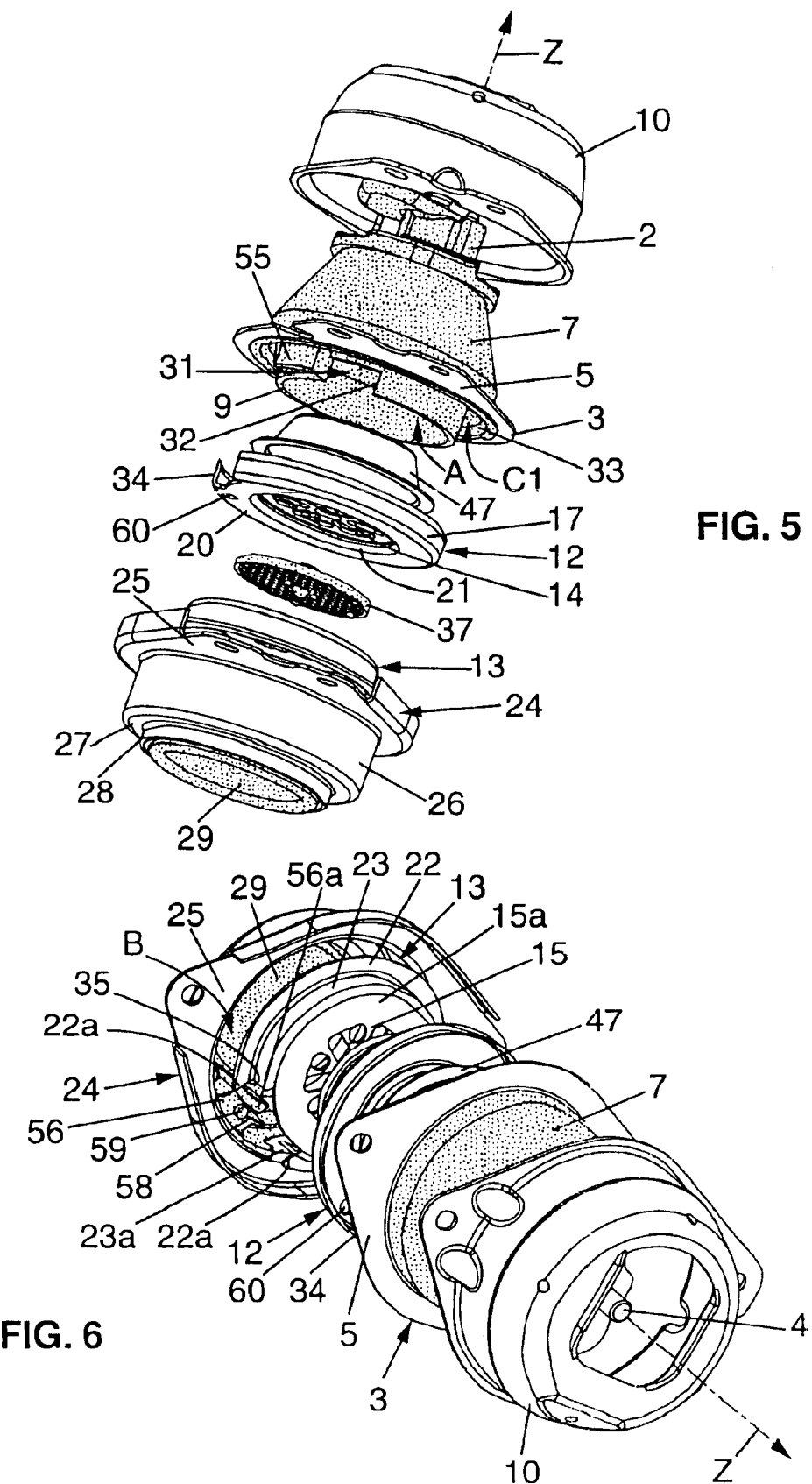

HYDRAULIC VIBRATION-DAMPING SUPPORT

FIELD OF THE INVENTION

The present invention relates to hydraulic vibration-damping supports serving, for example, for mounting motor vehicle engines on the bodies of such vehicles.

More precisely, the invention relates to a hydraulic vibration-damping support serving to interconnect first and second rigid elements so as to damp and filter vibration between said elements, the support comprising:

first and second rigid strength members serving to be fixed to respective ones of the first and second rigid elements to be interconnected;

an elastomer body that is substantially bell-shaped, extending about a central axis between a top secured to the first strength member and an annular base secured to the second strength member;

a working chamber filled with liquid and defined at least in part by the elastomer body;

a compensation chamber filled with liquid and defined at least in part by a flexible elastomer wall;

a rigid partition that separates the working chamber from the compensation chamber, which rigid partition comprises a sheet metal first piece that is in leaktight contact with the annular base of the elastomer body, and a rigid second piece that is in leaktight contact with said sheet metal first piece and that co-operates with the flexible wall to define the compensation chamber, the sheet metal first piece being provided with a first central grating that communicates with the working chamber, and the rigid second piece being provided with a second central grating that communicates with the compensation chamber while co-operating with the first grating to define a valve member recess;

a decoupling valve member disposed in the valve member recess to move over a short stroke parallel to the central axis to close off the first and second gratings; and a constricted passage filled with liquid and that puts the working chamber into communication with the compensation chamber, the constricted passage being defined in part by the sheet metal first piece and by the rigid second piece of the rigid partition, said constricted passage extending angularly around the decoupling valve member over a linear length that is greater than the perimeter of the rigid partition, and said constricted passage being made up of first and second stages, the first stage of the constricted passage being adjacent to the working chamber and extending between a first end that communicates with the working chamber and a second end that communicates with the second stage, while the second stage of the constricted passage is adjacent to the compensation chamber and extends between a first end which communicates with the second end of the first stage and a second end which communicates with the compensation chamber.

BACKGROUND OF THE INVENTION

A hydraulic vibration-damping support of that type is disclosed, for example, in Document FR-A-2 751 042, in which the rigid second piece of the rigid partition is a casting.

That known vibration-damping support is quite satisfactory as regards technical operation. In particular, it is known that the resonance frequency of the constricted passage, which resonance frequency is also the frequency at which the vibration-damping support offers its best performance for large-amplitude vibration, depends on the ratio between the length and the equivalent diameter of the constricted passage: by implementing the constricted passage in two stages, it is thus possible to obtain a passage length that is long and thus a resonance frequency that is low for said constricted passage, which can be necessary in certain uses.

Unfortunately, the above-mentioned vibration-damping support suffers from the drawback that the casting of its rigid partition is relatively costly to make, and also relatively weighty, which tends to increase both the cost and the weight of the vibration-damping support.

OBJECTS AND SUMMARY OF THE INVENTION

A particular object of the present invention is to mitigate those drawbacks.

To this end, in a vibration-damping support of the type in question:

the rigid second piece of the rigid partition is constituted by a second piece of sheet metal that is cut out and stamped;

the flexible elastomer wall is secured to a rigid base which is itself secured to the second strength member and which has at least one side wall extending about the central axis from the second strength member to an inner annular abutment margin;

the second piece of sheet metal includes an outer annular abutment margin that is in leaktight contact with the inner annular abutment margin of the base, the second piece of sheet metal further including a step which extends about the central axis from said outer annular abutment margin to a non-perforated annular zone that is in leaktight contact with the first piece of sheet metal, the second stage of the constricted passage being defined between the first piece of sheet metal, the side wall of the base, the inner annular abutment margin of the base, the outer annular abutment margin of the second piece of sheet metal, and the step of said second piece of sheet metal;

and the first stage of the constricted passage is defined between the annular base of the elastomer body, and the first piece of sheet metal.

By means of these provisions, it is possible to obtain a constricted passage that is very long, extending over two stages, by using a partition that is merely made up of two pieces of sheet metal, and that is therefore particularly lightweight and inexpensive.

In preferred embodiments of the vibration-damping support the invention, it is optionally possible, in addition, to use any of the following provisions:

the second strength member includes an annular inner portion which is part of the base of the elastomer body and which forms a groove that is open facing towards the first piece of sheet metal, said groove co-operating with said first piece of sheet metal to define the first stage of the constricted passage, the first and second ends of the first stage of the constricted passage being separated from each other by an elastomer stopper that is part of the elastomer body;

the first piece of sheet metal is provided with an outer annular rim that extends about the central axis towards the second strength member to a free annular edge that is applied axially in leaktight contact against an outer portion of the second strength member, the inner portion of the second strength member being provided with an inner skirt that is extended parallel to the central axis beyond said free annular edge to come into contact with a radial annular portion that is part of the first piece of sheet metal, the first stage of the constricted passage being defined in part by said inner skirt and by said outer rim of the first piece of sheet metal;

the first piece of sheet metal includes a non-perforated annular portion which is in leaktight axial contact with the second piece of sheet metal and which is extended inwards by an annular step that is itself extended by the first grating, the valve member recess being defined laterally by said annular step of the first piece of sheet metal;

the first stage of the constricted passage communicates with the second stage of the constricted passage via an opening cut out in the first piece of sheet metal, and the second stage of the constricted passage communicates with the compensation chamber via an opening cut out in the second piece of sheet metal;

the opening cut out in the second piece of sheet metal is provided at least in the outer annular abutment margin and in the step of said second piece of sheet metal, the first and second ends of the second stage of the constricted passage being separated from each other by an elastomer stopper molded integrally with the flexible elastomer wall against an inner face of the inner abutment margin and an inner face of the side wall of the base, said elastomer stopper of the base penetrating in part into the opening in the second piece of sheet metal, and the second central grating having a non-perforated portion that is applied axially in leaktight contact against said elastomer stopper of the base;

the elastomer stopper of the base is provided with a slot that is open axially towards the elastomer body and laterally towards the first end of the second stage of the constricted passage, the step of the second piece of sheet metal having an edge that laterally defines the opening cut out in said second piece of sheet metal and that penetrates into said slot;

the flexible elastomer wall is molded over the base so that it forms extra thickness in the vicinity of the elastomer stopper of the base, the opening cut out in the second piece of sheet metal forming two edges in the outer annular abutment margin of said second piece of sheet metal, the two edges being disposed on either side of the elastomer stopper of the base and on either side of said extra thickness; and the elastomer stopper of the base is provided with a stud that projects axially towards the elastomer body, and the first piece of sheet metal includes a portion that comes into leaktight axial abutment against the elastomer stopper of the base, and that is provided with a hole in which the stud is engaged.

BRIEF DESCRIPTION OF THE DRAWINGS

Other characteristics and advantages of the invention appear from the following description of an embodiment of it given by way of non-limiting example and with reference to the accompanying drawings.

In the drawings:

FIGS. 5 and 6 are exploded perspective views of the vibration-damping support of FIG. 1.

MORE DETAILED DESCRIPTION

In the various figures, like references designate identical or similar elements.

Figure 1:
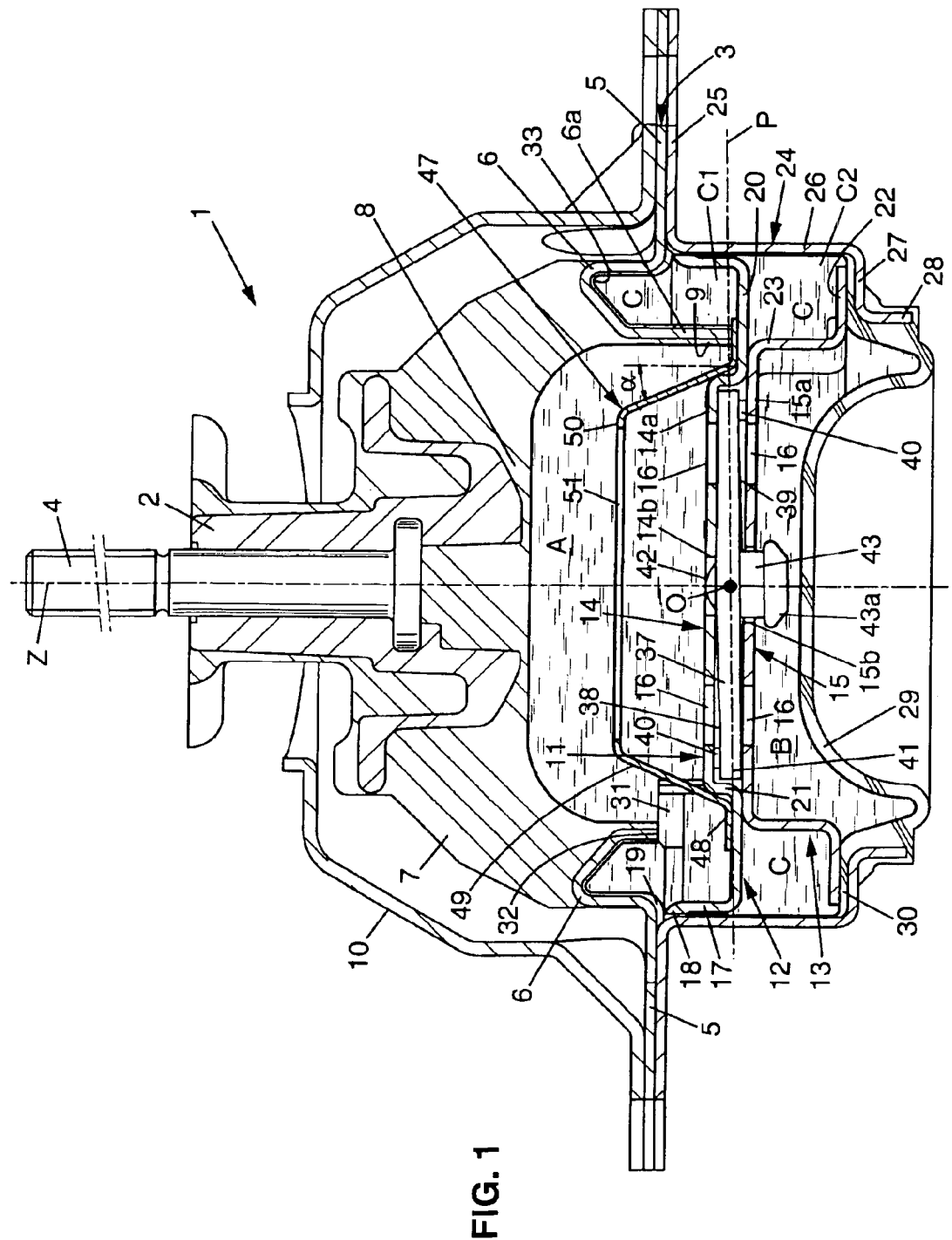
FIG. 1 is a vertical section view through a vibration-damping support in an embodiment of the invention.

FIG. 1 shows a hydraulic vibration-damping support 1 having first and second strength members 2, 3 which, for example, serve to be fixed respectively to the engine-and-gearbox unit and to the body of a vehicle.

In the example in question, the first strength member 2 is in the form of a metal block made of a light alloy, for example. The metal block is centered on a vertical axis Z and it is secured to a threaded pin 4 making it possible, for example, to fix the block to the engine-and-gearbox unit.

The second strength member 3 is formed by a ring of cut-out and stamped sheet metal, also centered on the axis Z. In the example shown, the second strength member 3 has an outer portion 5 that extends in a radial plane about the axis Z and that serves, for example, to be fixed to the body of the vehicle, and an inner portion 6 that is recessed, that is of substantially upside-down U shaped cross-section, and that forms an annular groove 33 that is open axially facing away from the first strength member 2. The inner portion 6 also forms an axial inner skirt 6a that extends downwards further than the outer portion 5.

The two strength members 2, 3 are connected together via a relatively thick elastomer body 7 which is sufficiently compression resistant to take up the static forces due to the weight of the engine-and-gearbox unit. The elastomer body 7 has a bell-shaped side wall that extends between a top 8 molded over the first strength member 2, and an annular base 9 which is molded over the bottom portion 6 of the second strength member.

In addition, the second strength member 3 is secured to a limiting cap 10 that is made of sheet metal, that is annular in shape, and that covers the elastomer body 7 with clearance being left, and with a passageway being left for the pin 4. The cap 10 thus limits the relative movement between the first and second strength members 2, 3.

The second strength member 3 is also secured to a rigid partition 11 which co-operates with the elastomer body 7 to define a first chamber A filled with liquid and referred to as the "working chamber".

In the example in question, the rigid partition 11 is made up of first and second pieces of stamped sheet metal 12, 13 that are mutually superposed and that are dish-shaped. In their central portions, they respectively form first and second flat gratings 14, 15 which are provided with holes 16 and which extend perpendicularly to the central axis Z.

For example, the first piece of sheet metal 12 comprises:

an annular rim 17 which extends parallel to the axis Z, and which has a free top annular edge 18 in leaktight abutment against a layer of elastomer 19 which is part of the elastomer body 7 and which is overmolded under the outer portion 5 of the second strength member;

an annular portion 20 which extends radially inwards from the bottom end of the rim 17, the inner skirt 6a of the second strength member being in leaktight abutment against said annular portion 20;

a step 21 which extends towards the working chamber A from the radially innermost edge of the annular portion 20; and said first grating 14 which extends the step 21 radially inwards.

In addition, in the example in question, the second piece of sheet metal 13 comprises:

an annular outer abutment margin 22 which extends radially relative to the central axis Z;

an annular step 23 which extends axially parallel to the axis Z towards the first piece of sheet metal 12; and said second grating 15 which has an outer periphery in abutment under the annular portion 20 of the first piece of sheet metal 12.

The vibration-damping support 1 further includes a base 24 made of cut-out and stamped sheet metal and comprising:

an annular abutment margin 25 which is fixed to the outer portion 5 of the second strength member, e.g. by crimping, and which is in leaktight abutment against said layer of elastomer 19 under the outer portion 5 of the second strength member;

an axial annular side wall 26 which extends from the inner periphery of the abutment margin 25 parallel to the axis Z and going away from the second strength member 3;

a bottom abutment margin 27 which extends the bottom end of the side wall 26 radially inwards; and an axial rib 28 which extends axially away from the elastomer body 7 from the radially innermost portion of the abutment margin 27.

The abutment margin 27 and the rib 28 of the base 24 are overmolded by a flexible bellows 29 which is made of elastomer, which also forms a layer 30 of elastomer covering the abutment margin 27 of the base, and against which the abutment margin 22 of the second piece of sheet metal 13 comes into leaktight abutment.

Thus, the bellows 29 co-operates with the partition 11 to define a second chamber B referred to as a "compensation chamber" and filled with liquid.

The compensation chamber B communicates with the working chamber A via an annular constricted passage C which extends over substantially two turns and over two stages around the chambers A and B, namely:

a first stage C1 which communicates with the working chamber A via an opening 31 obtained by means of a cutout 32 provided in the inner skirt 6a of the second strength member, and by means of a corresponding recess in the base 9 of the elastomer body, the first stage C1 of the constricted passage being defined between the first piece of sheet metal 12 and the annular groove 33 provided in the base 9 of the elastomer body, inside the recessed inner portion 6; and a second stage C2 which is defined by the first and second pieces of sheet metal 12, 13 and by the side wall 26 of the base, the second stage C2 communicating with the first stage C1 via an opening 34 provided in the first piece of sheet metal 12 (see FIG. 5), and said second stage C2 further communicating with the compensation chamber B via an opening 35 provided in the second piece of sheet metal 13 (see FIG. 6).

In addition, the vibration-damping support 1 also includes a decoupling valve member 37 (shown in FIGS. 1 to 3) which is mounted with a small amount of clearance (e.g. approximately in the range 0.5 millimeters (mm) to 1 mm) between the first and second gratings 14, 15.

This decoupling valve member is in the form of an elastomer pad which is suitable for vibrating between the first and second gratings 14, 15 by being applied alternately against the two gratings and by closing them off when the first and second strength members 2, 3 undergo relative vibratory movements.

On its first and second faces 38, 39, the decoupling valve member 37 has projecting elastomer studs 40 which are disposed to abut against the first and second gratings 14, 15 so that, in the absence of relative vibration between the first and second strength members 2, 3, the valve member 37 has a midplane P that is disposed on a slant relative to the first and second gratings 14, 15.

When the decoupling valve member is subjected to vibration, the studs 40 are suitable for being flattened under the effect of the pressure of the liquid in the chambers A, B which communicate respectively with the first and second faces 38, 39 of the decoupling valve member via the first and second gratings 14, 15. Thus, the peripheral rim 41 of the valve member can thus come to press in leaktight manner against the non-perforated annular portions 14a, 15a surrounding the holes 16 of the gratings 14, 15.

In addition, the valve member 37 is advantageously provided with centering lugs 42, 43 which co-operate by mutual engagement with the gratings 14, 15 to center the decoupling valve member 37. In the example shown, the first centering lug 42 is hemispherical in shape and it penetrates into a hole 14b in the first grating 14, while the second centering lug 43 is clipped into a hole 15b in the second grating 15, the second centering lug 43 having an enlarged head 43a which penetrates into the compensation chamber B.

Figure 2:
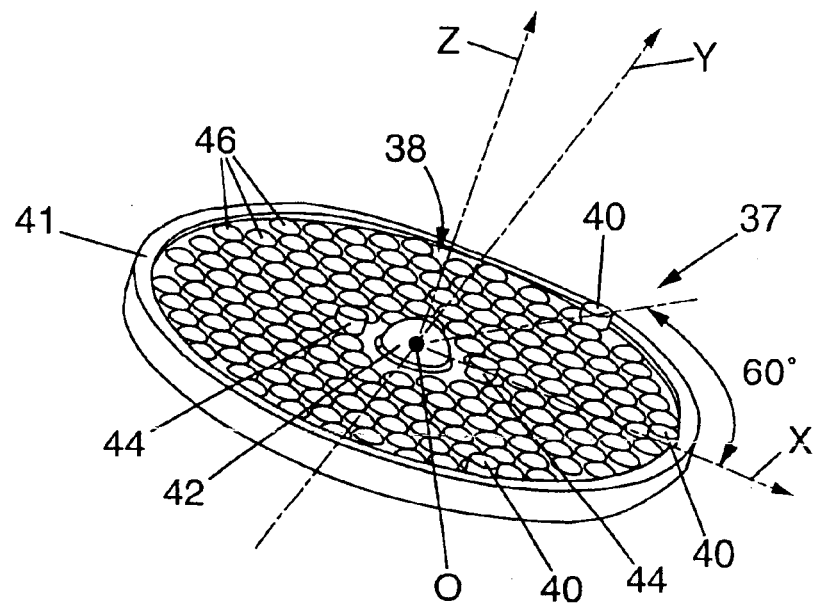
FIGS. 2 and 3 are perspective views of respective ones of the two faces of a decoupling valve member that is part of the vibration-damping support of FIG. 1.
Figure 3:
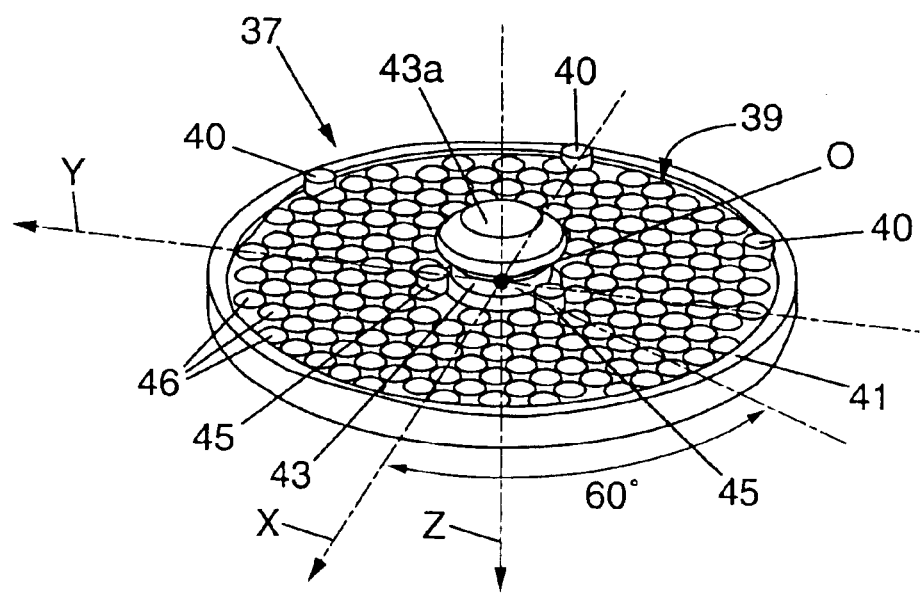

As shown in more detail in FIGS. 2 and 3, the studs 40 that cause the decoupling valve member to be in an inclined position are preferably disposed close to the outer periphery of the decoupling valve member, and are referred to below as "outer studs".

The outer studs 40 of the decoupling valve member are preferably distributed in first and second groups of outer studs 40. The outer studs 40 of the first group are disposed on the first face 38 only, on one side only of a geometrical construction line passing across the decoupling valve member parallel to the midplane P of said decoupling valve member, while the outer studs 40 of the second group are disposed on the second face 39 only of the decoupling valve member, on the other side of said construction line.

In the example in question, the decoupling valve member 37 is in the shape of a disk and the construction line in question is a diametrical axis Y substantially perpendicular to the central axis Z and passing through the center O of the valve member.

In the example shown, the first group of outer studs comprises three outer studs 49, one of which is disposed in alignment with an axis X passing through the center O of the valve member and perpendicular to the axis Y (the axes X and Y defining the above mentioned midplane P of the decoupling valve member), while the other two outer studs 40 of the first group are disposed substantially at 60° from the axis X about the center O of the decoupling valve member.

In addition, also in the example shown, the second group of outer studs also comprises three outer studs 40 which are disposed substantially symmetrically to the outer studs 40 of the first group about the axis Y. Thus, the outer studs 40 of the second group also include an outer stud that is aligned with the axis X and two outer studs that are disposed substantially at 60° from the axis X about the center O of the decoupling valve member. The outer studs 40 of the first and second groups are disposed in the vicinity of the above-mentioned outer rim 41 of the decoupling valve member, which outer rim 41 projects towards the gratings 14, 15 from the two faces 38, 39 of the decoupling valve member. However, the outer studs 40 extend beyond the outer rim 41 towards the gratings 14, 15.

By means of these provisions, and in particular because of the inclined position of the valve member imposed by the outer studs 40, banging of the valve member against the gratings is reduced significantly and the dynamic stiffness of the vibration-damping support is reduced at high frequencies.

Advantageously, in order to contribute to improving the acoustic performances of the vibration-damping support further, it is also possible to make the following provisions:

it is possible to provide the first face 38 of the decoupling valve member with two inner studs 44 disposed in the vicinity of the centering lug 42 and having, for example, the same size as the outer studs 40, the inner studs 44 being, for example, disposed in alignment with the center O of the valve member along the axis X;

it is possible to provide the second face 39 of the decoupling valve member with two inner studs 45 situated in the vicinity of the centering lug 43 and disposed, for example, on the side of the axis Y opposite to its side on which the outer studs 40 of the second group are situated, the inner studs 45 being, for example, disposed symmetrically about the axis X so that each of them forms an angle of about 60° with the axis X about the center O of the valve member; and it is possible to provide both faces 38, 39 of the decoupling valve member with rounded projections 46 that project respectively towards the first and second gratings 14, 15, preferably by being flush with the rim 41, and in any event without projecting beyond the studs 40, 44, 45.

It should be noted that the faces 38, 39 of the valve member 37 could be inverted without going beyond the ambit of the invention.

Advantageously, the vibration-damping support 1 further includes a deflector 47 in the form of an annular ring centered on the axis Z, and which extends inside the working chamber A by surrounding the first grating 14 and by converging towards the top 8 of the elastomer body. The opening 31 via which the constricted passage C opens out into the working chamber A lies radially outside the deflector 47.

In the example shown, the deflector 47 has an abutment margin 48 which extends radially relative to the axis Z and which is clamped axially between the base 9 of the elastomer body and the annular portion 20 of the first piece of sheet metal 12. The abutment margin 48 is extended radially inwards and axially towards the top 8 of the elastomer body by a side wall 49 which, in the example shown is frustoconical, by forming an angle a lying, for example, in the range 15° to 35° with the axis Z. The side wall 49 is itself extended, at its top end, by a flat rim 50 which extends substantially radially inwards and which defines a circular opening 51. The width of the rim 50 lies, for example, in the range 2% of the diameter of the opening 51 to 5% of the diameter of the opening 51.

By means of the above-described provisions, the acoustic characteristics of the vibration-damping support 1 are improved very significantly, and in particular its dynamic stiffness K at high frequencies is improved very significantly.

Figure 4:
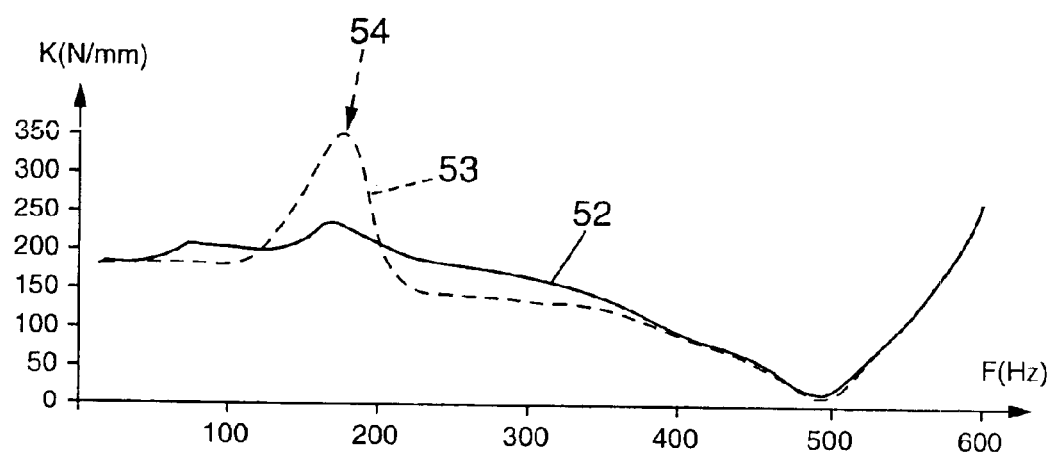
FIG. 4 is a graph showing the dynamic stiffness of the vibration-damping support of FIG. 1 as a function of frequency, compared with the dynamic stiffness of the same vibration-damping support equipped with a decoupling valve member with no studs and no deflector in its working chamber.

In particular, FIG. 4 shows, as an uninterrupted line, the curve 52 of the dynamic stiffness K of the vibration-damping support along the axis Z as a function of frequency F, and, as a dashed line, the curve 53 of the dynamic stiffness of the same vibration-damping support 1 but as provided with a conventional decoupling valve member and as not provided with a deflector 47.

It can be seen from FIG. 4 that the vibration-damping support of the invention makes it possible to avoid a stiffness peak 54 that is characteristic of prior art vibration-damping supports. That stiffness peak corresponds to acoustic vibration being transmitted between the engine and the body of the vehicle.

It should be noted that both the decoupling valve member 37 of the invention and the deflector 47 of the invention procure advantageous effects on the acoustic characteristics of the vibration-damping support and that, optionally, each of these two elements may be used independently from the other.

In other words, the deflector 47 may be used effectively with a decoupling valve member other than the above-described decoupling valve member 37, and the above-described valve member 37 may be used advantageously in the absence of the deflector 47.

However, the inventors of the present invention have observed that by combining the decoupling valve member 37 of the invention with the deflector 47 of the invention, it is possible to procure advantageous effects that are considerably greater than the effects that can be expected in view of the effects procured by the valve member 37 in isolation, and of the effects procured by the deflector 47 in isolation.

In addition, it should be noted that the embodiment of the constricted passage C described above is particularly inexpensive insofar as said embodiment makes it possible to obtain a constricted passage C that is long, extending over two turns, without having to use a light alloy casting, as is usually necessary.

Figure 7:
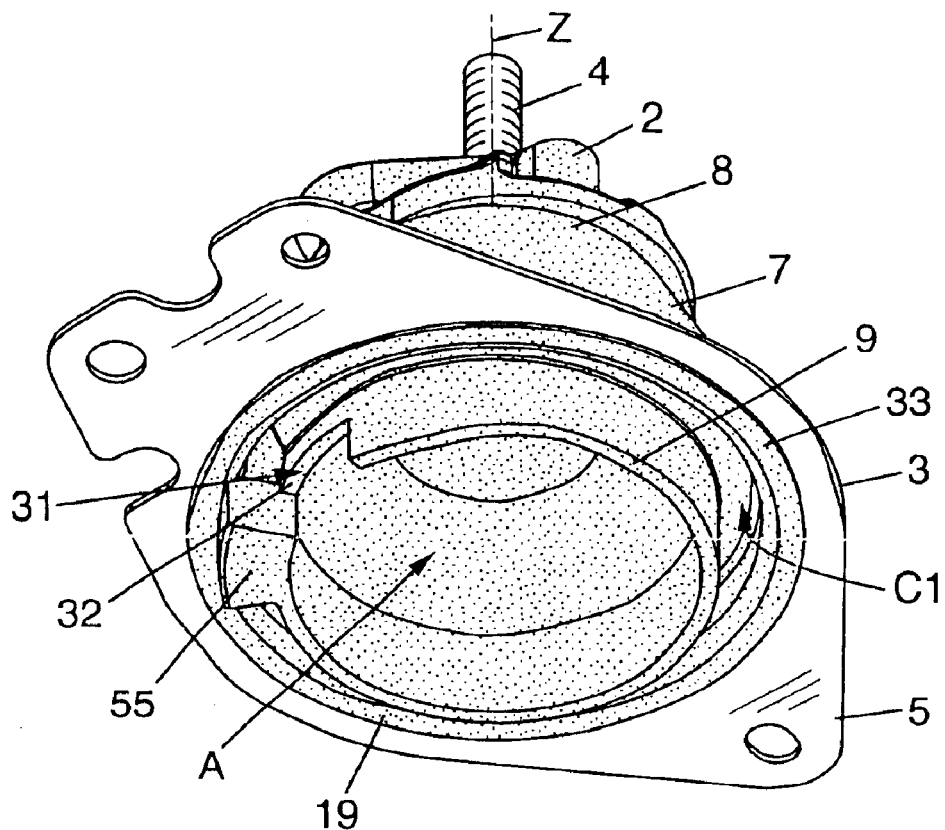
FIGS. 7 and 8 are detail perspective views of two portions of the vibration-damping support of FIG. 1, one of which comprises a compression-resistant elastomer body, the other portion comprising an elastomer bellows.
Figure 8:
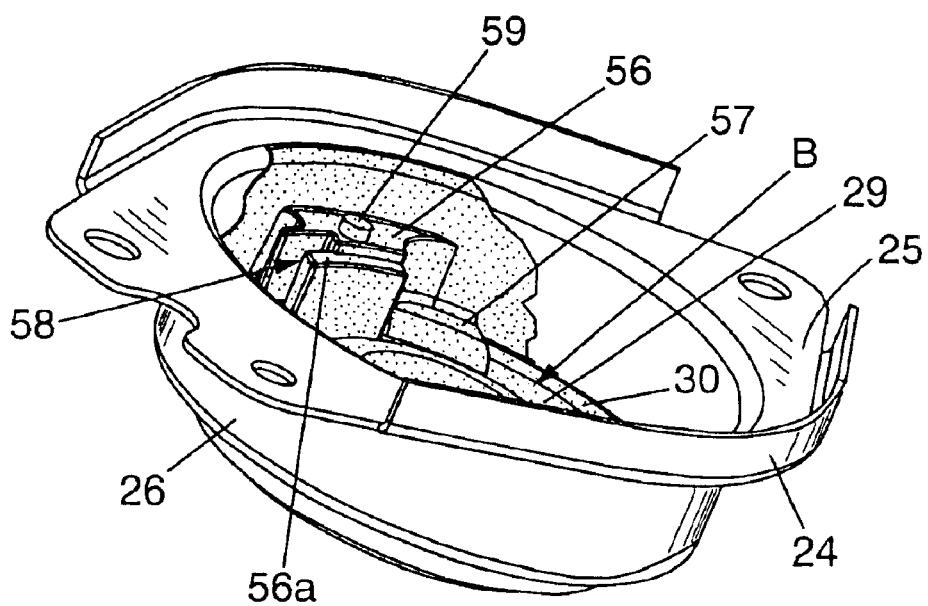

The way in which the constricted passage is implemented in the example in question is shown in more detail in FIGS. 5 to 8:

as shown in FIGS. 5 and 7, the elastomer body 7 forms an elastomer stopper 55 which closes off the first stage C1 of the constricted passage between firstly the opening 31 that puts the constricted passage into communication with the working chamber A, and secondly the opening 34 that is cut out in the annular rim 17 and in the annular portion 20 of the piece of sheet metal 12 to put the first and second stages C1, C2 of the constricted passage into communication with each other; and the elastomer bellows 29 is molded integrally with an elastomer stopper 56 that is shown clearly in FIGS. 6 and 8 and that closes off the second stage C2 of the constricted passage between the above-mentioned opening 34 and the opening 35 that puts the second stage C2 into communication with the compensation chamber B, the opening 35 being cut out in the abutment margin 22, in the step 23, and in the outer periphery of the non-perforated annular portion 15a of the second piece of sheet metal 13.

Thus, the liquid which passes from the working chamber A to the compensation chamber B follows the entire length of the constricted passage C, firstly following the first stage C1 in one angular direction, then the second stage C2, preferably in the same angular direction.

It should be noted that assembly of the first and second pieces of sheet metal 12, 13 in the vibration-damping support is made easier, in the example in question, by the following provisions:

the edges 22a of the abutment margin 22, which edges define in part the cut-out 35 in the second piece of sheet metal 13, come into engagement on either side of the elastomer stopper 56 and of an extra thickness of elastomer 57 molded integrally with said elastomer stopper (see FIGS. 6 and 8);

the stopper 56 has an abutment surface 56a lying in a radial plane and against which a segment of the non-perforated annular portion 15a of the grating 15 comes to bear in leaktight manner, which segment is situated in the vicinity of one of the edges 23a of the step 23 of the second piece of sheet metal 13, so that the elastomer stopper 56 closes off a portion of the opening 35, thereby separating said opening 35 from the opening 34 that communicates with the first stage C1 of the constricted passage;

the edge 23a of the step 23, which edge defines the opening 35 in part opposite from the non-closed-off portion of said opening, is offset towards the inside of said opening 35 relative to the corresponding edge 22a of the abutment margin 22, and said edge 23a comes into engagement in a circularly arcuate slot 58 centered about the axis Z, said slot 58 being provided in the elastomer stopper 56, opposite from the portion of the opening 35 that is left free by the stopper 56;

the elastomer stopper 56 is advantageously provided with a centering stud 59 extending axially towards the first piece of sheet metal 12 and engaging into a corresponding hole 60 in said first piece of sheet metal; and the abutment margin 25 of the base and the outer portion 5 of the second strength member are not circularly symmetrical in shape, so as to determine the angular positions of these two parts relative to each other during assembly.

What is claimed is:

1. A hydraulic vibration-damping support serving to interconnect first and second rigid elements so as to damp and filter vibration between said elements, the support comprising:

first and second rigid strength members serving to be fixed to respective ones of the first and second rigid elements to be interconnected;

an elastomer body that is substantially bell-shaped, extending about a central axis between a top secured to the first rigid strength member and an annular base secured to the second rigid strength member;

a working chamber filled with liquid and defined at least in part by the elastomer body;

a compensation chamber filled with liquid and defined at least in part by a flexible elastomer wall;

a rigid partition that separates the working chamber from the compensation chamber, which rigid partition comprises a sheet metal first piece that is in leaktight contact with the annular base of the elastomer body, and a rigid second piece that is in leaktight contact with said sheet metal first piece and that co-operates with the flexible elastomer wall to define the compensation chamber, the sheet metal first piece being provided with a first central grating that communicates with the working chamber, and the rigid second piece being provided with a second central grating that communicates with the compensation chamber while co-operating with the first central grating to define a valve member recess;

a decoupling valve member disposed in the valve member recess to move over a short stroke parallel to the central axis to close off the first and second central gratings; and a constricted passage filled with liquid and that puts the working chamber into communication with the compensation chamber, the constricted passage being defined in part by the sheet metal first piece and by the rigid second piece of the rigid partition, said constricted passage extending angularly around the decoupling valve member over a linear length that is greater than the perimeter of the rigid partition, and said constricted passage being made up of first and second stages, the first stage of the constricted passage being adjacent to the working chamber and extending between a first end that communicates with the working chamber and a second end that communicates with the second stage, while the second stage of the constricted passage is adjacent to the compensation chamber and extends between a first end which communicates with the second end of the first stage and a second end which communicates with the compensation chamber;

wherein the rigid second piece of the rigid partition is constituted by a sheet metal second piece that is cut out and stamped;

wherein the flexible elastomer wall is secured to a rigid base which is itself secured to the second rigid strength member and which has at least one side wall extending about the central axis from the second rigid strength member to an inner annular abutment margin;

wherein the sheet metal second piece includes an outer annular abutment margin that is in leaktight contact with the inner annular abutment margin of the base, the sheet metal second piece further including a step which extends about the central axis from said outer annular abutment margin to a non-perforated annular zone that is in leaktight contact with the sheet metal first piece, the second stage of the constricted passage being defined by the sheet metal first piece, the at least one side wall of the base, the inner annular abutment margin of the base, the outer annular abutment margin of the sheet metal second piece, and the step of said sheet metal second piece;

wherein the first stage of the constricted passage is defined by the annular base of the elastomer body, and the sheet metal first piece;

and wherein the first stage of the constricted passage communicates with the second stage of the constricted passage via an opening cut out in the sheet metal first piece, and the second stage of the constricted passage communicates with the compensation chamber via an opening cut out in the sheet metal second piece.

2. The vibration-damping support according to claim 1, in which the opening cut out in the sheet metal second piece is provided at least in the outer annular abutment margin and in the step of said sheet metal second piece, the first and second ends of the second stage of the constricted passage being separated from each other by an elastomer stopper molded integrally with the flexible elastomer wall against an inner face of the inner abutment margin and an inner face of the side wall, said elastomer stopper penetrating in part into the opening in the sheet metal second piece, and the second central grating having said non-perforated zone that is applied axially in leaktight contact against said elastomer stopper.

3. The vibration-damping support according to claim 2, in which the elastomer stopper is provided with a slot that is open axially towards the elastomer body and laterally towards the first end of the second stage of the constricted passage, the step of the sheet metal second piece having an edge that laterally defines the opening cut out in said sheet metal second piece and that penetrates into said slot.

4. The vibration-damping support according to claim 2, in which the flexible elastomer wall is molded over the rigid base so that it forms extra thickness in the vicinity of said elastomer stopper, the opening cut out in the sheet metal second piece forming two edges in the outer annular abutment margin of said sheet metal second piece, the two edges being disposed on either side of the elastomer stopper of the base and on either side of said extra thickness.

5. The vibration-damping support according to claim 2, in which said elastomer stopper is provided with a stud that projects axially towards the elastomer body, and the sheet metal first piece includes a portion that comes into leaktight axial abutment against the elastomer stopper, and that is provided with a hole in which the stud is engaged.

* * * * *